(12) United States Patent
Kimura et al.

(10) Patent No.: US 11,722,769 B2
(45) Date of Patent: Aug. 8, 2023

(54) IMAGE PICKUP APPARATUS, CONTROL METHOD, AND STORAGE MEDIUM

(71) Applicant: CANON KABUSHIKI KAISHA, Tokyo (JP)

(72) Inventors: Hiroaki Kimura, Kanagawa (JP); Natsuko Sato, Kanagawa (JP); Ryo Kawasaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/690,123

(22) Filed: Mar. 9, 2022

(65) Prior Publication Data

US 2022/0303474 A1  Sep. 22, 2022

(30) Foreign Application Priority Data

Mar. 17, 2021 (JP) .................................. 2021-043123
Oct. 29, 2021 (JP) .................................. 2021-177170

(51) Int. Cl.
*H04N 23/67* (2023.01)
*H04N 23/611* (2023.01)

(52) U.S. Cl.
CPC ......... *H04N 23/672* (2023.01); *H04N 23/611* (2023.01); *H04N 23/673* (2023.01)

(58) Field of Classification Search
CPC ....... H04N 5/232122; H04N 5/232123; H04N 5/23219
See application file for complete search history.

(56) References Cited

FOREIGN PATENT DOCUMENTS

| JP | H11-038313 | A |   | 2/1999  |
|----|------------|---|---|---------|
| JP | 2003-075716 | A |   | 3/2003  |
| JP | 2010-008507 | A |   | 1/2010  |
| JP | 2010011042 | A | * | 1/2010  |
| JP | 2016-200702 | A |   | 12/2016 |
| JP | 2020-154283 | A |   | 9/2020  |

OTHER PUBLICATIONS

The above patent documents were cited in the Feb. 21, 2023 Japanese Office Action, which is enclosed with an English Translation, that issued in Japanese Patent Application No. 2021-177170.

* cited by examiner

*Primary Examiner* — Yogesh K Aggarwal
(74) *Attorney, Agent, or Firm* — Cowan, Liebowitz & Latman, P.C.

(57) ABSTRACT

An image pickup apparatus includes an object detecting unit detecting at least one object in an image, a focus detecting unit that provides a focus detection of the object, a determination unit that determines the tilt angle and the focus position based on a focus detecting result by the focus detecting unit, and a control unit that controls the tilt driving unit and the focus driving unit based on the determined tilt angle and focus position. The control unit selects an object from among a plurality of objects, which is to be used to determine the tilt angle and the focus position, based on at least one of a detected size and a detected position of the object, and accuracy of the focus detecting result. The determination unit determines the tilt angle and the focus position based on a focus detecting result of a selected object.

17 Claims, 14 Drawing Sheets

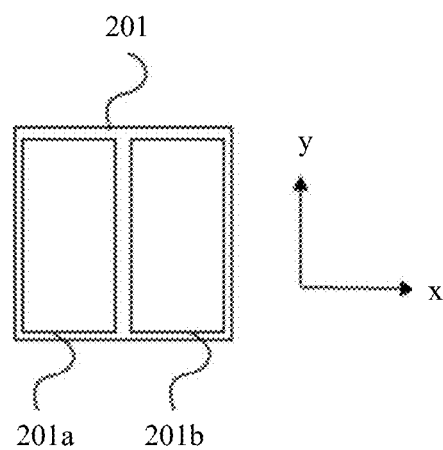
FIG. 2
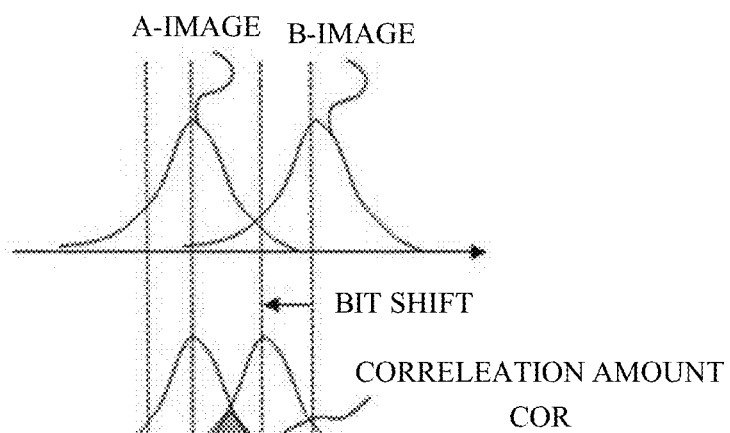
FIG. 3A
FIG. 3B
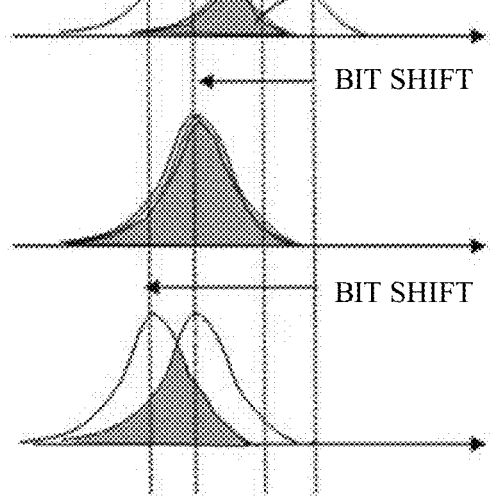
FIG. 3C
FIG. 3D

| OBJECT | DETECTED SIZE | DETECTED POSITION (IMAGE HEIGHT) | FOCUS DETECTING ACCURACY | RELIABILITY |
|---|---|---|---|---|
| X | 0.9 | 0.6 | 0.8 | 0.43 |
| Y | 0.8 | 0.8 | 0.9 | 0.57 |
| Z | 0.4 | 0.9 | 0.2 | 0.07 |

FIG. 10

| OBJECT | DETECTED SIZE | DETECTED POSITION (IMAGE HEIGHT) | FOCUS DETECTING ACCURACY | RELIABILITY |
|---|---|---|---|---|
| A | 0.6 | 0.2 | 0.2 | 0.02 |
| B | 0.3 | 0.2 | 0.3 | 0.02 |
| C | 0.6 | 0.1 | 0.2 | 0.01 |
| D | 0.6 | 0.1 | 0.2 | 0.01 |

FIG. 18

IMAGE PICKUP APPARATUS, CONTROL METHOD, AND STORAGE MEDIUM

BACKGROUND OF THE INVENTION

Field of the Invention

The present invention relates to an image pickup apparatus that can provide tilt control.

Description of the Related Art

Conventionally, a surveillance camera may be installed at a high place so that an optical axis of the surveillance camera may be directed diagonally downward to monitor a person passing by a road or to capture an image of a car or its license plate.

A focal plane that is focused during imaging is a plane perpendicular to the optical axis. When the optical axis of the surveillance camera is directed diagonally downward, the focal plane that is focused during imaging does not coincide with the imaging plane of an object that is an actual target of the imaging. Therefore, a focused area is part of the image, and the other areas are in defocused states.

As a solution for this problem, there is a method for deepening a depth of field and preventing a defocus by narrowing an aperture in a diaphragm of the optical system.

However, the surveillance camera that provides imaging under low illuminance often captures images while the aperture of the diaphragm is almost fully opened. As a result, the depth of field becomes shallow, the entire screen becomes out of focus, and an image is captured in a defocused state.

To solve such a problem, a technology called the Scheimpflug principle is generally known which widens the depth of field range by tilting a lens or an image sensor relative to each other.

Japanese Patent Laid-Open No. ("JP") 2003-75716 discloses a technology for determining control amounts of a focus position and a tilt angle so as to focus on a plurality of objects. This technology needs to detect an in-focus position for each object. As a method of detecting the in-focus position, a method is described of executing processing of controlling the focus position for each object so that a contrast evaluation value is maximized. An image pickup apparatus disclosed in JP 2003-75716 calculates a control amount of the tilt angle and the focus position based on object distances and image heights at two points.

However, JP 2003-75716 is silent about positions of the two points to be used in controlling the tilt angle and the focus position. Therefore, when there are a plurality of objects, the control amounts of the tilt angle and the focus position may not be correctly calculated depending on the selection of the two points.

Then, a shift from an ideal tilted surface position occurs. Recently, due to a larger number of pixels in the image sensors and a larger size of a display device, higher-definition images are demanded. Therefore, the method disclosed in JP 2003-75716 cannot provide sufficient focusing when a 4K or 8K camera is used.

SUMMARY OF THE INVENTION

The present invention provides an image pickup apparatus that can calculate a tilt angle and a focus position with high accuracy by selecting a proper object when there are a plurality of objects.

An image pickup apparatus according to one aspect of the present invention includes a tilt driving unit configured to tilt an image sensor to change a tilt angle that is an angle between an imaging plane of the image sensor and an orthogonal plane orthogonal to an optical axis of an imaging optical system, a focus driving unit configured to drive a focus lens in the imaging optical system to change a focus position, and at least one processor or circuit configured to perform a function of at least one of an object detecting unit configured to detect at least one object in an image that is captured by the image pickup apparatus, a focus detecting unit configured to provide a focus detection of the object detected by the object detecting unit, a determination unit configured to determine the tilt angle and the focus position based on a focus detecting result by the focus detecting unit, and a control unit configured to control the tilt driving unit and the focus driving unit based on the tilt angle and the focus position determined by the determination unit. The control unit selects an object from among a plurality of objects detected by the object detecting unit, which is to be used to determine the tilt angle and the focus position, based on at least one of a detected size and a detected position of the object detected by the object detecting unit, and accuracy of the focus detecting result of the object detected by the focus detecting unit. The determination unit determines the tilt angle and the focus position based on a focus detecting result of a selected object.

A control method of an image pickup apparatus according to another aspect of the present invention that includes a tilt driving unit configured to tilt an image sensor to change a tilt angle as an angle between an imaging plane of the image sensor and an orthogonal plane orthogonal to an optical axis of an imaging optical system, and a focus driving unit configured to drive a focus lens of the imaging optical system to change a focus position includes an object detecting step of detecting an object in an image that is captured by the image pickup apparatus, a focus detecting step of providing a focus detection of the object detected by the object detecting step, a selecting step of selecting an object from among a plurality of objects detected by the object detecting step, which is to be used to determine the tilt angle and the focus position based on at least one of a detected size and a detected position of the object detected by the object detecting step, and accuracy of a focus detecting result of the object detected by the focus detecting unit, a determining step of determining the tilt angle and the focus position based on the focus detecting result of the object by the focus detecting step selected by the selecting step, and a control step of controlling the tilt driving unit and the focus driving unit based on the tilt angle and the focus position determined by the determining step.

A computer-readable storage medium according to another aspect of the present invention stores a computer program that causes a computer of an image pickup apparatus including an image sensor configured to capture an optical image formed by an imaging optical system, to execute processing according to the above control method.

Further features of the present invention will become apparent from the following description of exemplary embodiments with reference to the attached drawings.

BRIEF DESCRIPTION OF THE DRAWINGS

FIG. 2 illustrates a pixel configuration of an image sensor.

FIGS. 3A to 3D explain a calculation method of a bit shift amount.

FIG. 10 is a reliability table.

FIG. 18 is a reliability table.

DESCRIPTION OF THE EMBODIMENTS

Referring now to the accompanying drawings, a detailed description will be given of embodiments according to the present invention.

Overall Structure

Figure 1:
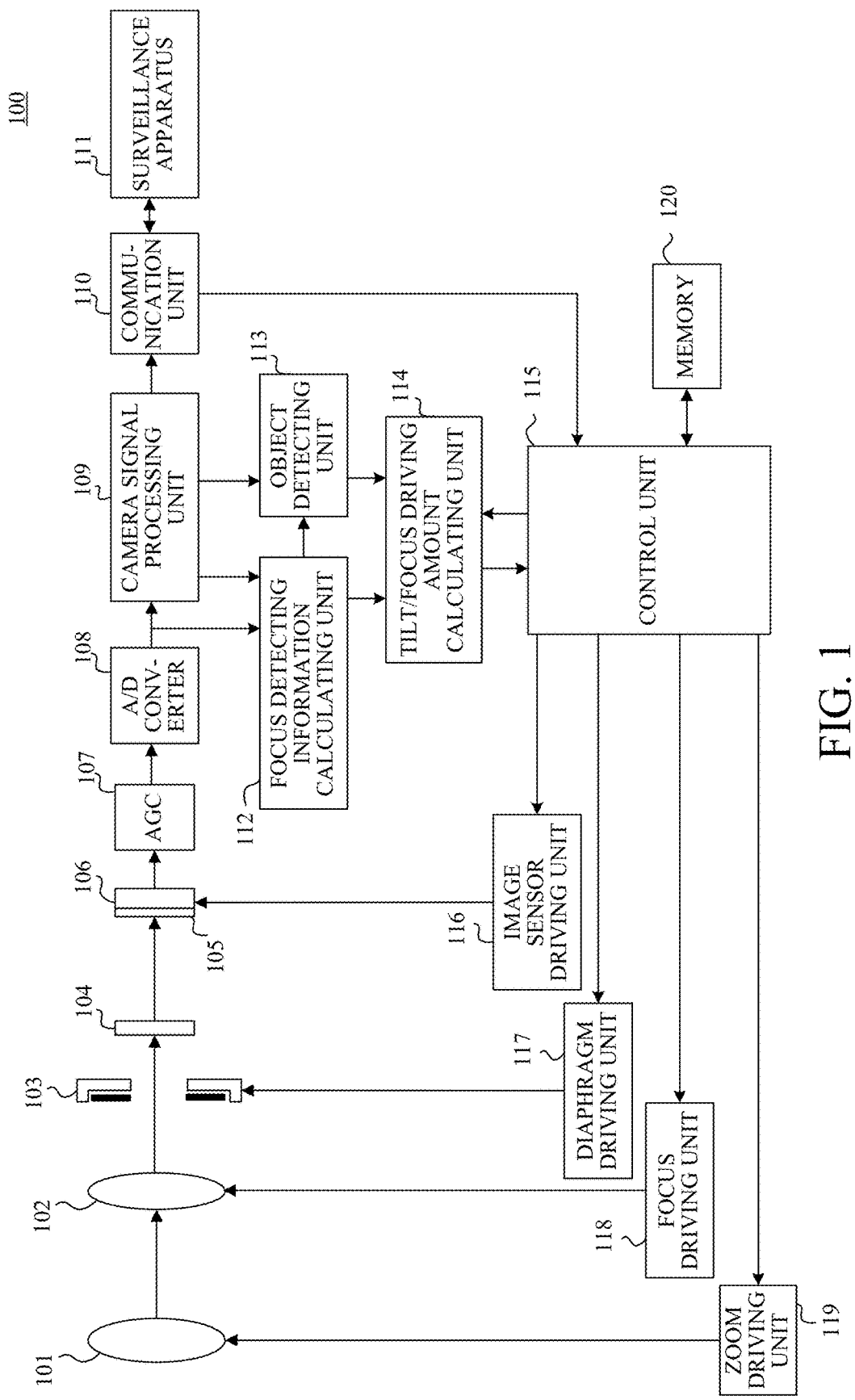
FIG. 1 is a block diagram illustrating a configuration of an image pickup apparatus.

Referring now to FIG. 1, a description will be given of an image pickup apparatus according to this embodiment. FIG. 1 is a block diagram of an image pickup apparatus (control apparatus) 100. A zoom lens 101 is moved in an optical axis direction to vary a focal length. A focus lens 102 is moved in the optical axis direction to control focusing (focus control).

A diaphragm unit 103 adjusts a light amount. In this embodiment, an imaging optical system includes the zoom lens 101, the focus lens 102, and the diaphragm unit 103.

The light that has passed through the imaging optical system is received by an image sensor 106 via a bandpass filter (BPF) 104 and a color filter 105. The bandpass filter 104 may be inserted into and ejected from the optical path of the imaging optical system.

The image sensor 106 includes a CMOS sensor or the like, and photoelectrically converts an optical image (object image) formed via the imaging optical system.

An analog electric signal (imaging signal) output from the image sensor 106 is gain-controlled by an AGC (Auto Gain Control) 107. An A/D converter 108 converts an analog electric signal into a digital signal (digital imaging signal).

A camera signal processing unit 109 performs various image processing (such as a gamma conversion and a white balance adjustment) for the digital image pickup signal to generate a video signal. The video signal is output to a surveillance apparatus 111 connected to the image pickup apparatus 100 by a wired or wireless communication via a communication unit 110.

The communication unit 110 receives a command from an external device such as an external PC and outputs a control signal, such as a command, to a control unit 115 in the image pickup apparatus 100.

In this embodiment, a system including the above various components up to the surveillance apparatus 111 is called an image pickup apparatus. On the other hand, in FIG. 1, the components other than the surveillance apparatus 111 are housed in a single housing to form a surveillance camera.

A focus detecting information calculating unit (focus detecting unit) 112 receives RGB pixel values or luminance values from the camera signal processing unit 109 for each target object area and acquires focus detecting (or distance) information based on the phase difference.

An object detecting unit 113 receives a result from the camera signal processing unit 109 and detects an object in the captured image. The object detecting unit 113 can also detect an object designated by the user or a preset object, such as a person or a car.

A tilt/focus driving amount calculating unit (determination unit) 114 acquires the focus detecting information from the focus detecting information calculating unit 112 and the object information from the object detecting unit 113.

The tilt/focus driving amount calculating unit 114 calculates a proper (optimal) tilt angle and focus position according to a scene based on the focus detecting information and the object information, and the tilt angle and the focus position from the control unit 115.

The control unit 115 has a built-in CPU as a computer and executes as control means various operations for the entire image pickup apparatus based on a computer program stored in a memory 120. The control unit 115 controls the tilt angle and the focus position based on the tilt angle and the focus position calculated by the tilt/focus driving amount calculating unit 114.

The control unit 115 performs a focus control, a zoom control, and a diaphragm control in autofocusing (AF) and manual focusing (MF) according to instructions from the external device such as the external PC via the communication unit 110. The control unit 115 receives current position information from an image sensor driving unit 116, a diaphragm driving unit 117, a focus driving unit 118, and a zoom driving unit 119, and outputs the current position information to the tilt/focus driving amount calculating unit 114.

The control unit 115 instructs the tilt angle and the focus position calculated by the tilt/focus driving amount calculating unit 114 to the image sensor driving unit 116 and the focus driving unit 118, respectively.

The image sensor driving unit 116 functions as a tilt driving unit, tilts the image sensor 106 based on the tilt angle instructed by the control unit 115, and controls the tilt angle. That is, the image sensor driving unit 116 tilts the image sensor 106 to change the tilt angle that is an angle between the imaging plane of the image sensor 106 and an orthogonal plane orthogonal to the optical axis of the imaging optical system.

Normally, a rotation axis that tilts the image sensor 106 is an axis in a horizontal direction that passes through a center of a captured image (along a longitudinal direction of the image sensor), and the image sensor 106 is tilted relative to the imaging optical system around this rotation axis as a center. However, this embodiment is not limited to this example.

The diaphragm driving unit 117 controls a position of the diaphragm unit 103 based on a diaphragm setting value transmitted from the control unit 115. The focus driving unit 118 controls a position of the focus lens 102 (performs a focus control) based on a focus setting value instructed by the control unit 115 (based on a defocus amount). The zoom driving unit 119 controls a position of the zoom lens 101 based on a zoom setting value transmitted from the control unit 115.

The focus detecting information calculating unit 112 performs focus detecting information calculating processing by a phase difference detecting method using focus detecting data obtained by the camera signal processing unit 109. More specifically, the camera signal processing unit 109 generates as the focus detecting data a pair of image data formed by light beams passing through a pair of pupil areas in the imaging optical system. The focus detecting information calculating unit 112 detects the defocus amount as a focus detecting measurement result based on a shift amount between the pair of image data. Thus, the focus detecting information calculating unit 112 performs a focus detection (distance measurement) by an imaging-plane phase-difference detecting method based on the output of the image sensor 106 without using a dedicated AF sensor.

A detailed description will be given below of a focus detecting information calculating operation by the imaging-plane phase-difference detecting method of the focus detecting information calculating unit 112. The focus detecting information calculating unit 112 may acquire an evaluation value (contrast evaluation value) relating to a contrast of a specific frequency, and calculate a defocus amount based on a difference between an original focus position and a focus position that provides a peak of the contrast evaluation value.

The memory 120 stores data relating to a program to be executed by the control unit 115, and also stores data relating to a shading correction coefficient and data relating to a conversion coefficient.

Focus Detecting Information Calculating Operation by Imaging-Plane Phase-Difference Detecting Method Referring now to FIG. 2, a description will be given of a pixel configuration of the image sensor 106. FIG. 2 is a pixel configuration diagram of the image sensor 106.

In the image sensor 106, each of all pixels 201 is divided into two photoelectric conversion units 201a and 201b in the X direction. The image sensor 106 can independently read each of the photoelectric conversion signals of the photoelectric conversion units 201a and 201b and the sum of the photoelectric conversion signals of the two photoelectric conversion units 201a and 201b, respectively.

By subtracting the photoelectric conversion signal of one photoelectric conversion unit (such as the photoelectric conversion unit 201a) from the sum of the photoelectric conversion signals of the two photoelectric conversion units 201a and 201b, a signal corresponding to the photoelectric conversion signal of the other photoelectric conversion unit (such as the photoelectric conversion unit 201b) can be obtained.

Each of the photoelectric conversion signals of the photoelectric conversion units 201a and 201b are used as focus detecting data for phase-difference AF. The sum of the photoelectric conversion signals of the two photoelectric conversion units 201a and 201b is used as normal captured image data.

The focus detecting information calculating unit 112 calculates, using a correlation calculation, a relative image shift amount between a signal (A-image) corresponding to the photoelectric conversion signal of the photoelectric conversion unit 201a and a signal (B-image) corresponding to the photoelectric conversion signal of the photoelectric conversion unit 201b generated in this way. Thereby, the focus detecting information calculating unit 112 can calculate a bit shift amount [bit], which is a correlation degree between the pair of image signals. By multiplying the bit shift amount by the conversion coefficient, the bit shift amount is converted into a defocus amount [mm] in a predetermined area.

In this embodiment, the output signal of one of the photoelectric conversion units 201a and 201b and the sum of the output signals of the two photoelectric conversion units 201a and 201b are read out of each pixel 201 in the image sensor 106. For example, when the output signal of the photoelectric conversion unit 201a and the sum of the output signals of the photoelectric conversion units 201a and 201b are read out, the output signal of the photoelectric conversion unit 201b can be obtained by subtracting the output of the photoelectric conversion unit 201a from the sum of the output signals of the photoelectric conversion units 201a and 201b. Thereby, both the A-image and the B-image can be acquired, and a focus detection by the imaging-plane phase-difference detecting method can be realized. The sum of the output signals of the photoelectric conversion units 201a and 201b generally forms one pixel (output pixel) of the output image. Since such an image sensor is known, a detailed description thereof will be omitted.

Next follows a description of the focus detecting information calculating operation by the imaging-plane phase-difference detecting method. The following focus detecting information calculating operation is executed mainly by the focus detecting information calculating unit 112.

First, the focus detecting information calculating unit 112 sets a focus detected position. Next, the focus detecting information calculating unit 112 reads out focus detecting data from the set focus detected position. Using the signal that is read out of the pixel at the focus detecting position set by the focus detecting information calculating unit 112, the focus detecting information calculating unit 112 generates a signal of each of the A-image and the B-image. Next, the focus detecting information calculating unit 112 acquires a bit shift amount P [bit] by finding a relative image shift amount between the A-image and the B-image using the correlation calculation.

Referring now to FIGS. 3A to 3D, a description will be given of an example of the correlation calculation method. FIGS. 3A to 3D explain a correlation calculating method (method of calculating a bit shift amount).

In FIGS. 3A to 3D, a vertical axis represents a signal value and a horizontal axis represents a bit (position), respectively. Assume that the signals of the A-image and the B-image are read out of the pixels (focus detecting pixels) in the image sensor 106. Then, the camera signal processing unit 109 performs digital filter processing for each of the A-image and the B-image in order to reduce noises. FIG. 3A illustrates filtered waveforms.

As illustrated in FIGS. 3A to 3D, the focus detecting information calculating unit 112 bit-shifts either the A-image signal or the B-image signal, or both the A-image signal and the B-image signal, and calculates a correlation amount COR at that time. The correlation amount COR is, but is not limited to, an area when the A-image and the B-image are superimposed on each other, a value obtained by subtracting the area of the B-image from the area of the A-image, a calculated value indicating the correlation degree, and the like. A description will now be given of a case where the correlation amount COR is defined as the area when the A-image and the B-image are superimposed on each other.

When the A-image and the B-image coincide with each other, the overlap area between the A-image and the B-image becomes large, providing a correlation and a large correlation amount COR. Now assume that the bit shift amount P [bit] is a shift amount [bit] when the correlation amount COR has a maximum value.

Next, the focus detecting information calculating unit 112 acquires a conversion coefficient K. A defocus amount DEF is obtained by multiplying the bit shift amount P by the conversion coefficient K.

Figure 4:
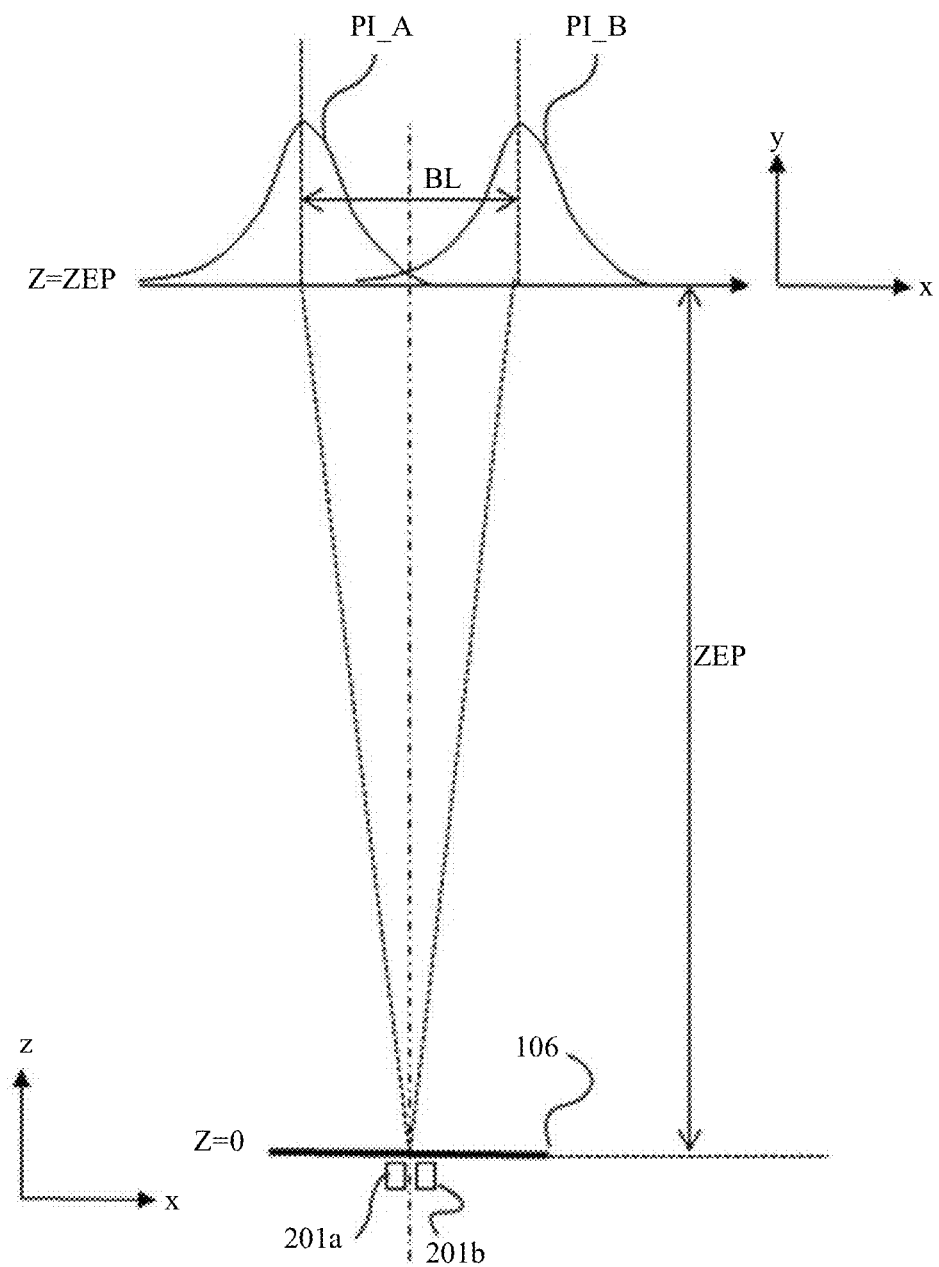
FIG. 4 illustrates a method of calculating a conversion coefficient K.

Referring now to FIG. 4, a description will be given of a calculation of the conversion coefficient K. FIG. 4 explains the calculation of the conversion coefficient K. In FIG. 4, a Z-axis denotes the optical axis direction of the imaging optical system, and Z=0 denotes a plane (imaging plane) of the image sensor 106. Zep denotes an exit pupil distance. A pupil intensity distribution PI_A and a pupil intensity distribution PI_B, which are light amount distributions of focus detecting light beams of the A-image and the B-image on Z=Zep are projected images made by projecting on the exit pupil plane the signals (focus detecting signals) output from the photoelectric conversion units 201a and 201b, respectively.

PI_A and PI_B in FIG. 4 each illustrate a one-dimensional pupil intensity distribution. A distance between centers of gravity of the pupil intensity distributions PI_A and PI_B is defined as a baseline length BL. A change amount [mm] in the optical axis direction relative to the bit shift amounts P [bit] of the A-image and the B-image can be obtained from a ratio of the exit pupil distance Zep and the baseline length BL.

The conversion coefficient K can be thus expressed as the following expression (1):

$$K = Zep/BL \quad (1)$$

Next, the focus detecting information calculating unit 112 calculates the defocus amount DEF [mm] using the following expression (2):

$$DEF = P \times K \quad (2)$$

In order to obtain an in-focus state at the focus detecting position, the tilt/focus driving amount calculating unit 114 calculates a driving amount M [lensmm] of the focus lens 102 using the following expression (3) based on the defocus amount DEF. Then, the control unit 115 controls the focus driving unit 118 to drive the focus lens 102.

$$M = DEF \times FS \quad (3)$$

In the expression (3), FS denotes a sensitivity for converting the defocus amount DEF [mm] into the lens driving amount M [lensmm].

The control unit 115 sets the lens driving amount M, and the focus driving unit 118 drives the focus lens 102 in the optical axis direction based on the set lens driving amount M. Thereby, an image that is in focus at the focal detecting position can be obtained.

Thus, the focus detecting information calculating unit 112 calculates the defocus amount DEF based on the focus detecting information acquired by the imaging-plane phase-difference detecting method, and the tilt/focus driving amount calculating unit 114 calculates a focus driving amount based on the defocus amount DEF.

Explanation of Tilt Control

Figure 5A:
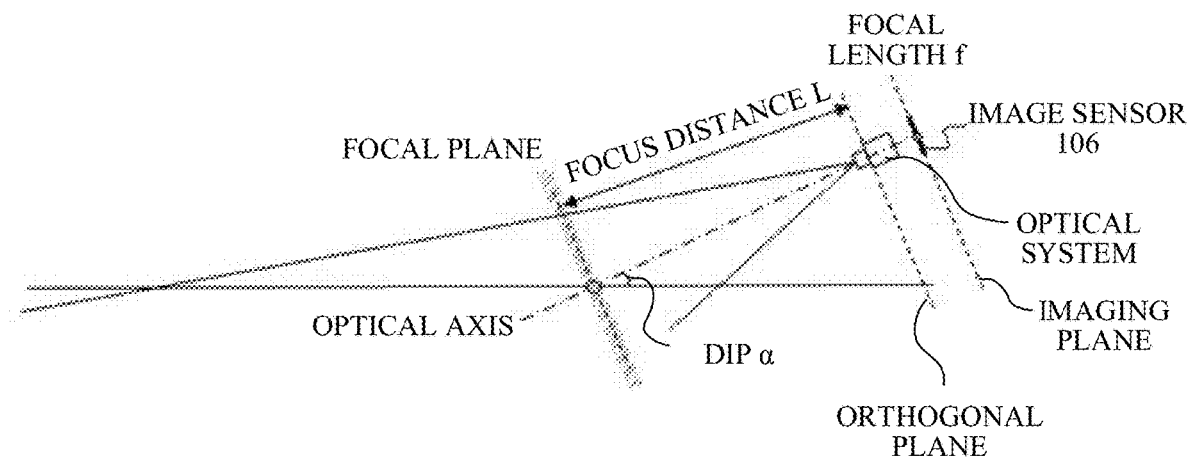
FIGS. 5A to 5C explain a tilt control.
Figure 5B:
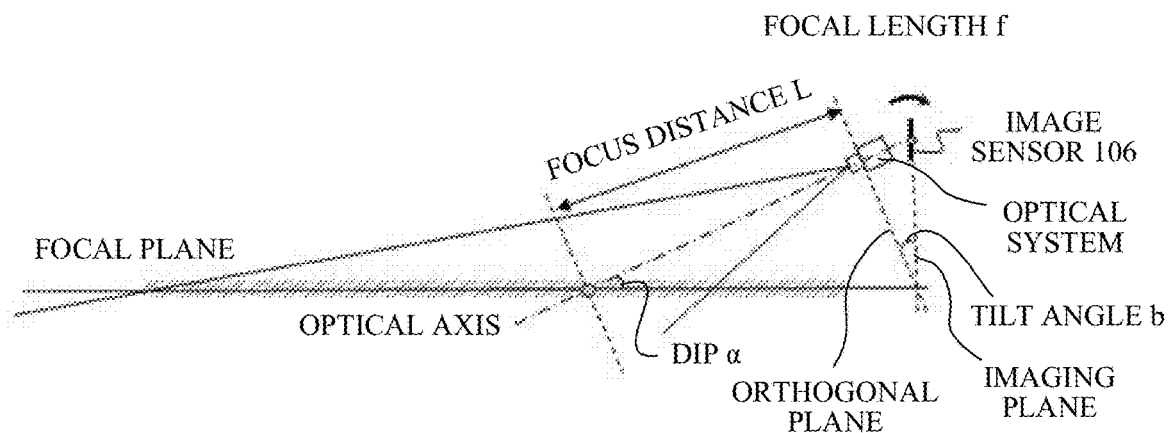
Figure 5C:
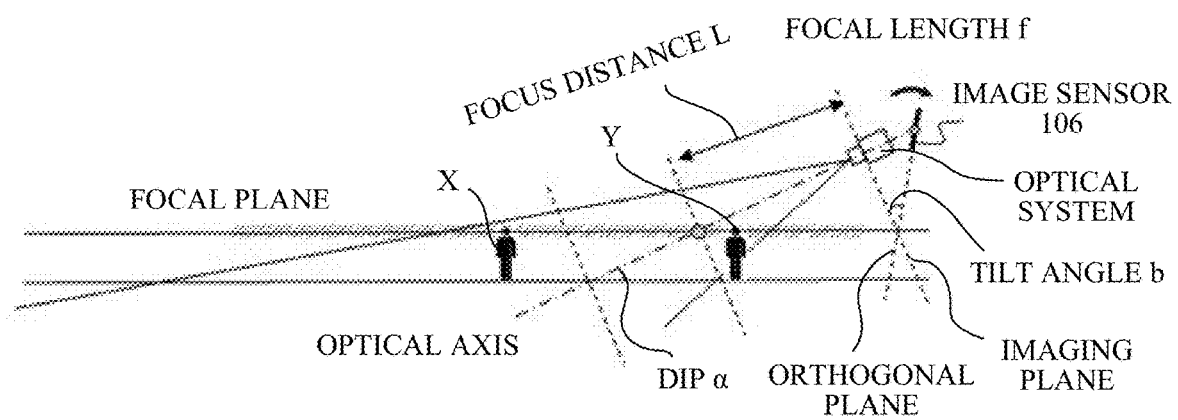

The tilt control will be described with reference to FIGS. 5A to 5C. FIGS. 5A to 5C explain the tilt control. FIG. 5A illustrates a state in which the orthogonal plane of the optical system (imaging optical system) and the imaging plane of the image sensor 106 are parallel to each other. A focus distance L is in focus, and a focal plane is parallel to each of the orthogonal plane of the optical system and the imaging plane of the image sensor 106.

FIG. 5B illustrates a state in which the image sensor 106 is rotated around the rotation axis of the image sensor from the state of FIG. 5A and the tilt control is performed. When the tilt control is performed, the focal plane is also rotated around the rotation axis of the focal plane corresponding to the rotation axis of the image sensor based on the Scheimpflug principle. It is therefore possible to focus on all objects from a short distance to a long distance on a certain plane. The Scheimpflug principle is a principle that when the principal plane of the optical system and the imaging plane of the image sensor 106 intersect on a certain straight line, the focal plane also intersects on the same straight line.

A tilt angle b is calculated using the following expression (4) based on the Scheimpflug principle:

$$B = \tan^{-1}(f/(L \tan(a))) \quad (4)$$

where f is a focal length, L is a focus distance, and a is a dip

FIG. 5C illustrates a scene in which an object X and an object Y exist as a plurality of objects. As illustrated in FIG. 5C, it is desirable to control the focal plane so that faces of the objects X and Y are in focus. Here, the term object includes part of the object such as the face of the object. Therefore, focus control is necessary in addition to the tilt control. An optimum focal plane (that is, optimum tilt angle and optimum focus position) is different for each object, and it is difficult for the user to manually adjust the focal plane.

Figure 6:
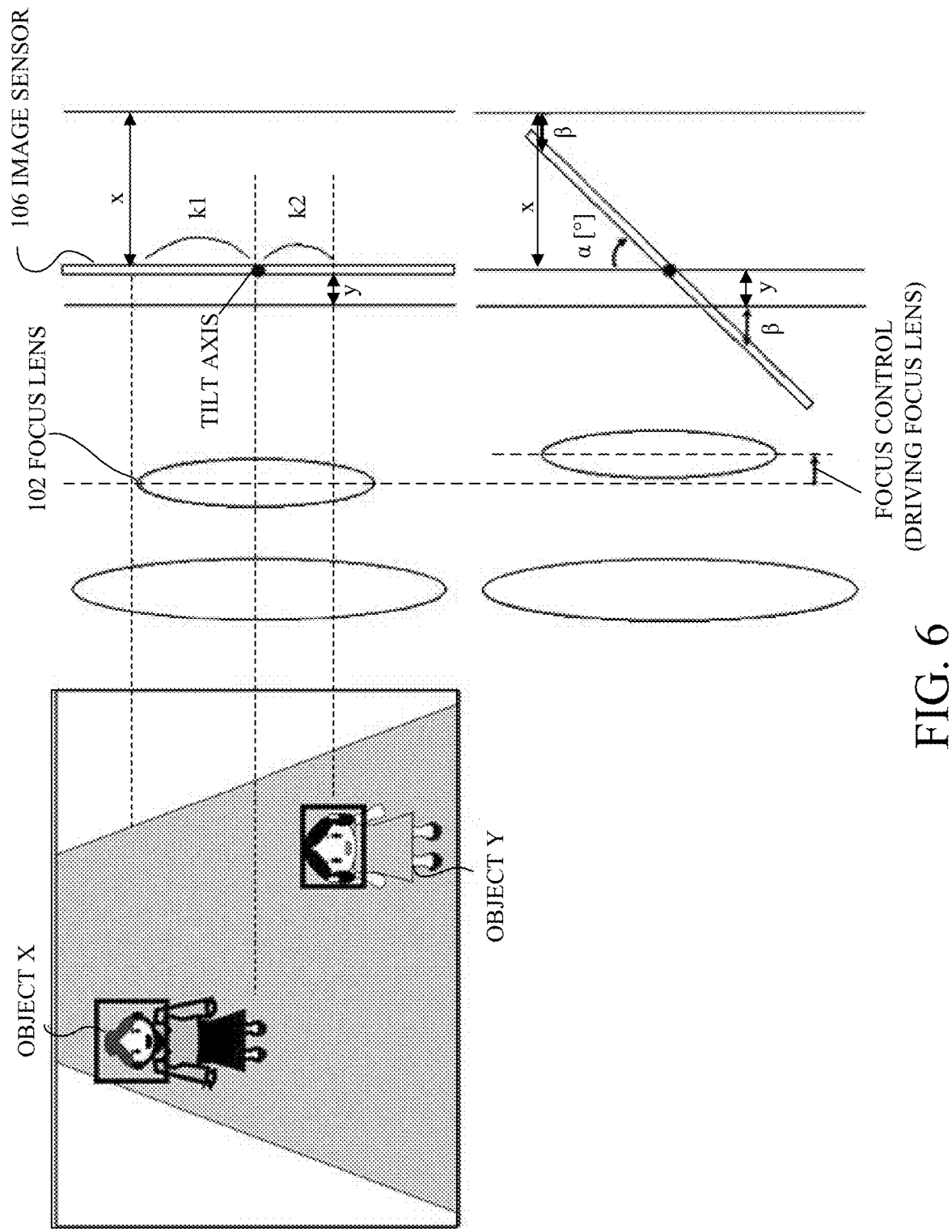
FIG. 6 illustrates the tilt control and focus control.

Referring now to FIG. 6, a description will be given of an example of calculating the optimum tilt angle and the optimum focus position according to the object.

FIG. 6 explains the tilt control and focus control. An object X and an object Y are target objects similar to FIG. 5C.

A current tilt angle and a position of the focus lens 102 are illustrated as a positional relationship of upper part in FIG. 6, where x denotes a correlation amount correction from the focal plane of the imaging optical system that is required to focus on the object X, and y denotes a correction amount from the focal plane of the imaging optical system that is required to focus on the object Y.

k1 [um] denotes a distance (image height) from the tilt axis to the object X on the image sensor 106, and k2 [um] denotes a distance (image height) from the tilt axis to the object Y on the image sensor 106.

The following expression (5) and (6) are established:

$$x - \beta = k1 \times \tan(\alpha) + \beta \quad (5)$$

$$y = k2 \times \tan(\alpha) - \beta \quad (6)$$

where $\alpha[°]$ is a tilt angle for focusing on the objects X and Y at the same time and $\beta$ is a focus correcting amount (focus position) on the focal plane due to the movement of the focus lens 102.

The tilt angle $\alpha$ and the focus correcting amount $\beta$ are expressed as in the following expressions (7) and (8), respectively, by solving the simultaneous equations (5) and (6).

$$\alpha = \tan^{-1}((x+y)/(k1+k2)) \quad (7)$$

$$\beta = (k2 \times x - k1 \times y)/(k1+k2) \quad (8)$$

A driving amount of the focus lens 102 can be simply calculated by dividing the focus correcting amount $\beta$ by sensitivity FS of the focus lens 102.

The driving amount of the focus lens 102 can be accurately calculated by solving a high-order equation or a polynomial according to the sensitivity FS. However, this embodiment is not limited to this example, and may use another method for the calculation.

Hence, unless the distance from the tilt axis on the image sensor 106 to the object is accurately calculated, focusing on the object may be insufficient even if the focus position and tilt angle are corrected.

First Embodiment

Figure 7:
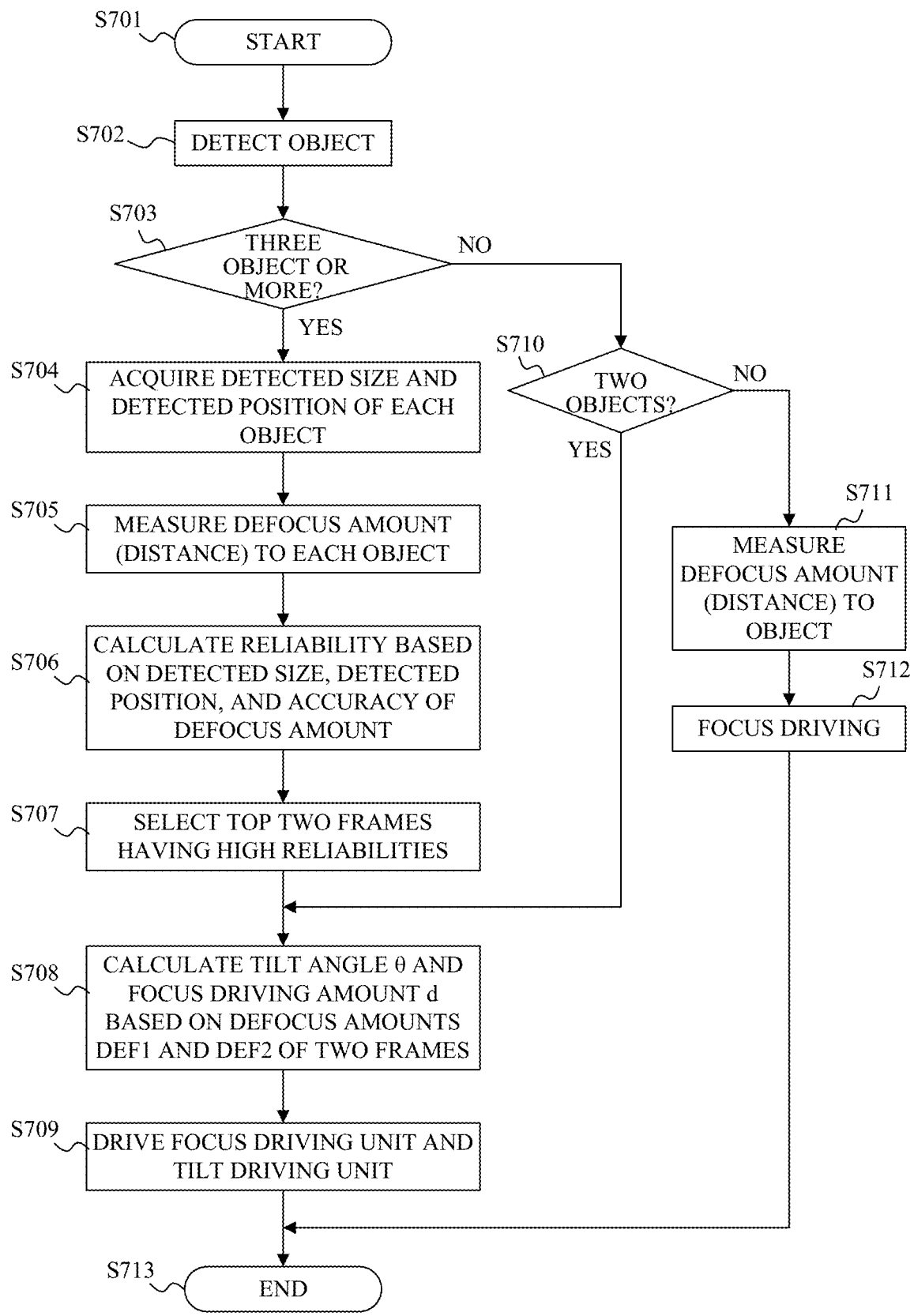
FIG. 7 is a flowchart illustrating tilt/focus control according to a first embodiment.

Referring now to FIG. 7, a description will be given of a tilt/focus position control method according to a first embodiment.

FIG. 7 is a flowchart of the tilt/focus position control processing according to this embodiment. Processing according to this embodiment is executed by the control unit 115 in accordance with a processing program as a computer program. The processing program is stored, for example, in a non-transitory computer-readable storage medium (such as the memory 120).

In the step S701, the communication unit 110 sends a tilt control start command to the control unit 115.

In the step S702, the object detecting unit 113 detects an object in an image captured by the image pickup apparatus 100. The object detection may be human body detection or object detection.

In the step S703, the control unit 115 counts the number of objects and determines whether the number of objects is three or more.

If the number of objects is three or more, the flow proceeds to the step S704. In the step S704, the control unit 115 acquires a detected position (image height) and a detected size of the object detected by the object detecting unit 113. The detected position (image height) is a distance from the rotation axis of the image sensor to the object. The detected size is determined by human body recognition or face recognition.

In the step S705, the focus detecting information calculating unit 112 measures a defocus amount (distance) as the focus detecting result at the detected position of each object for each object detected in the step S702. More specifically, the defocus amount (distance) is measured by aligning a frame with each object. This frame is called an AF frame, but this embodiment is not limited to this example. A phase difference method or a contrast method may be used to measure the defocus amount. The defocus amount is measured in the step S705, but in the case of the focus detection by the phase difference method, the focus detecting accuracy lowers as a distance from the current focus position to the object increases. When a distance from the center of the image of the object is long, the focus detecting accuracy is lowered due to the influence of the shading of the lens and the like. Therefore, if an object (or object frame) far from the image center is advertently selected as a focus detecting frame, the subsequent correction accuracies of the focus position and tilt angle deteriorate, so that an image may be in an insufficient focus state. Even the contrast method calculates an object distance from an in-focus position, and thus a mechanical error (play, unsteadiness) and a stop accuracy error are applied and an error occurs in the calculation of the object distance. Therefore, when two objects (or two frames) are close to each other, an error ratio increases, the correction accuracies of the focus position and the tilt angle become low, and consequently the image may be in an insufficient focus state.

Figure 8:
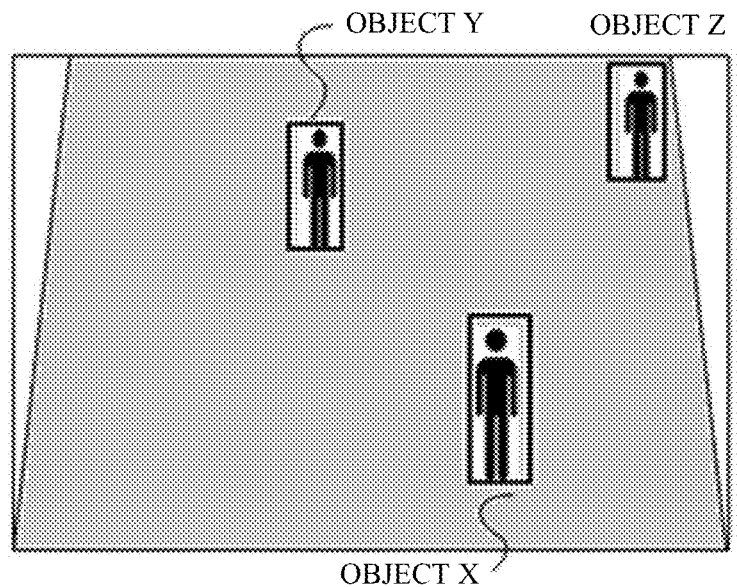
FIG. 8 illustrates a situation of a problem of the first embodiment.
Figure 9:
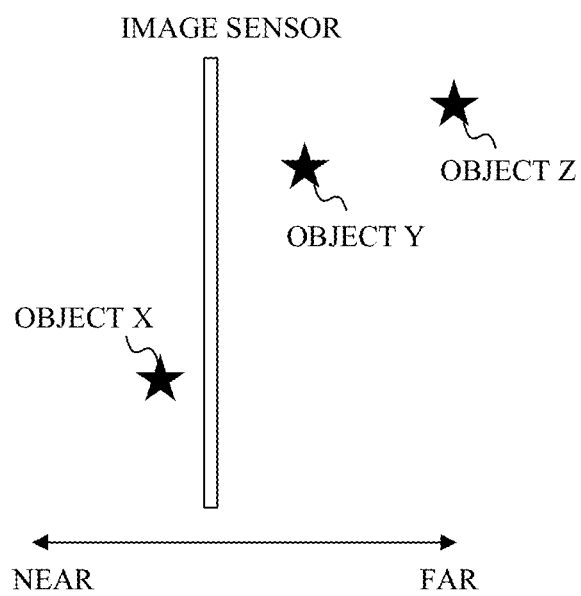
FIG. 9 illustrates a focus position on an imaging plane when the situation of FIG. 8 is measured by an imaging-plane phase-difference (detecting) method.

For example, FIG. 8 illustrates a situation having three objects. FIG. 9 illustrates a focus position on an imaging plane when the situation of FIG. 8 is detected by the imaging-plane phase-difference detecting method. The object Z has a high image height (a long distance from the rotation axis of the sensor), and a focal plane is located far from the image sensor. Therefore, the defocus amount detected by the phase difference method may be significantly different from the actual distance due to the above influence. In this case, if the focus position and the tilt angle are corrected using the defocus amount of the object Z, an image may be captured by an insufficient focal plane. For the above reasons, it is necessary to properly select an object to be used to calculate the tilt angle and the focus position in order to accurately perform the tilt/focus position control.

In the step S706, the control unit 115 calculates (determines) the reliability (suitableness degree) for each object (for each frame of the object) from the detected size of the object, the detected position (image height) of the object, and the accuracy of the defocus amount (focus detecting accuracy). In the calculation of the reliability, a table illustrated in FIG. 10 may be referred to. FIG. 10 is merely illustrative, and various modifications and variations may be made to a table creating method within the scope of the present invention. In FIG. 10, the reliability is calculated (determined) in consideration of all of the detected size of the object, the detected position of the object, and the accuracy of the defocus amount. The control unit 115 may calculate the reliability using at least one of the detected size of the object, the detected position of the object, and the accuracy of the defocus amount. The element and wight in calculating the reliability may be changed according to a focus detecting method for calculating a defocus amount and an imaging environment.

FIG. 10 illustrates a case where detected size Ta, detected position Tb, and accuracy Tc of the defocus amount, which are the elements, are evaluated from 0 to 1. The reliability is expressed by the following expression (9):

$$T = Ta \times Tb \times Tc \tag{9}$$

The reliability calculating expression is merely illustrative, and the weighting (weight) of each element may be changed according to the focus detecting method that was used to calculate the defocus amount and the imaging environment, or weights of the elements may be summed up. Various modifications and variations can be made to the reliability calculating method within the scope of the present invention. This is performed for each object, and the reliability for each object is calculated. In the case of FIG. 10, the objects X and Y having high reliabilities are selected. In FIG. 10, since a distance from the center of the image to Y is closer than to X, the focus detecting accuracy of Y is higher than that of X.

In the step S707, the control unit 115 selects the top two objects (or object frames) having high reliabilities. In selecting the objects as described above, a difference in image height between the two objects may be taken into account.

In the step S708, the tilt/focus driving amount calculating unit 114 calculates a focus driving amount d and a tilt angle driving amount θ from defocus amounts DEF1 and DEF2 as the focus detecting results for the two selected objects (or object frames).

In the step S709, the control unit 115 instructs the focus driving unit 118 and the image sensor driving unit 116 to drive according to the driving amounts calculated by the focus driving amount calculating unit 114 in the step S708.

If the number of objects is not three or more in the step S703, the flow proceeds to the step S710.

In the step S710, the control unit 115 determines whether or not the number of objects is two. If the number of objects is two, the flow proceeds to the step S708. If the number of objects is one, the flow proceeds to the step S711.

In the step S711, the focus detecting information calculating unit 112 measures the defocus amount of the object.

In the step S712, the control unit 115 instructs the focus driving unit 118 to drive according to the defocus amount measured in the step S711.

When there is only one object, the image sensor driving unit 116 is not driven, but only the focus driving unit 118 is driven.

In the step S713, the control unit 115 ends this control processing.

This embodiment selects two objects (or two frames) for performing the tilt/focus position control according to the reliabilities and thereby selects the objects (or object frames) suitable for the tilt/focus position control. Therefore, this embodiment can calculate the tilt angle and the focus position with high accuracy.

Second Embodiment

The first embodiment has discussed an example of implementing the tilt/focus position control method by selecting an object based on the reliability.

Figure 11:
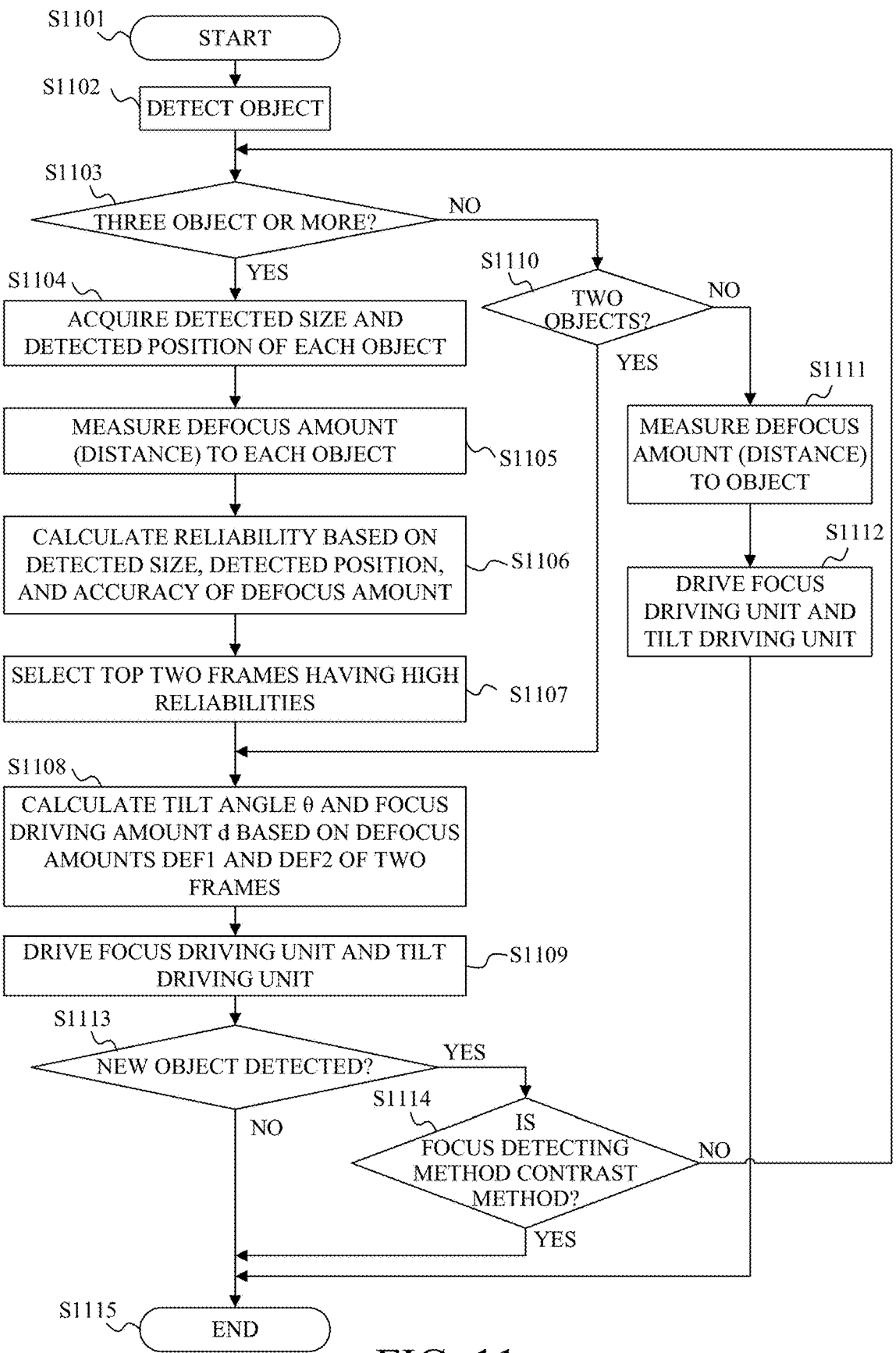
FIG. 11 is a flowchart illustrating tilt/focus control according to the second embodiment.

Referring now to a flowchart illustrated FIG. 11, a description will be given of tilt/focus position control processing according to a second embodiment of the present invention. This embodiment will describe a control method when a new object is recognized or the object in the image has moved during the tilt/focus position control. A detailed description of the same configuration as that of the first embodiment will be omitted.

This embodiment is different from the first embodiment in processing in the steps S1113 and S1114.

In the step S1113, the control unit 115 determines whether the object detecting unit 113 has detected a new object in the image, or whether the object has moved since the first detection.

If the new object has not been detected or if the object has not moved since the first detection, the flow proceeds to the step S1115, and this control processing is terminated. If the new object is detected or if the object has moved since the first detection, the flow proceeds to the step S1114.

In the step S1114, the control unit 115 determines whether the focus detecting method is a contrast method.

When the focus detecting method is the contrast method, driving the focus lens 102 for the focus detection deteriorates the imaging quality. The focus detection is not performed again, and the flow proceeds to the step S1115. When the focus detecting method is an image-plane phase-difference detecting method, this method does not drive the focus lens 102 during focusing and thus the flow returns to the step S1103. That is, the control unit 115 determines whether or not to recalculate (redetermine) the reliability according to the focus detecting method.

When a new object is detected in an image during the tilt/focus position control or when the object in the image has moved, and when the reliability of the object is high, this embodiment can perform the tilt/focus position control with high accuracy based on the tilt angle and focus position that were initially calculated.

Third Embodiment

The first embodiment has discussed an example of implementing the tilt/focus position control method by selecting an object based on reliability.

Figure 12:
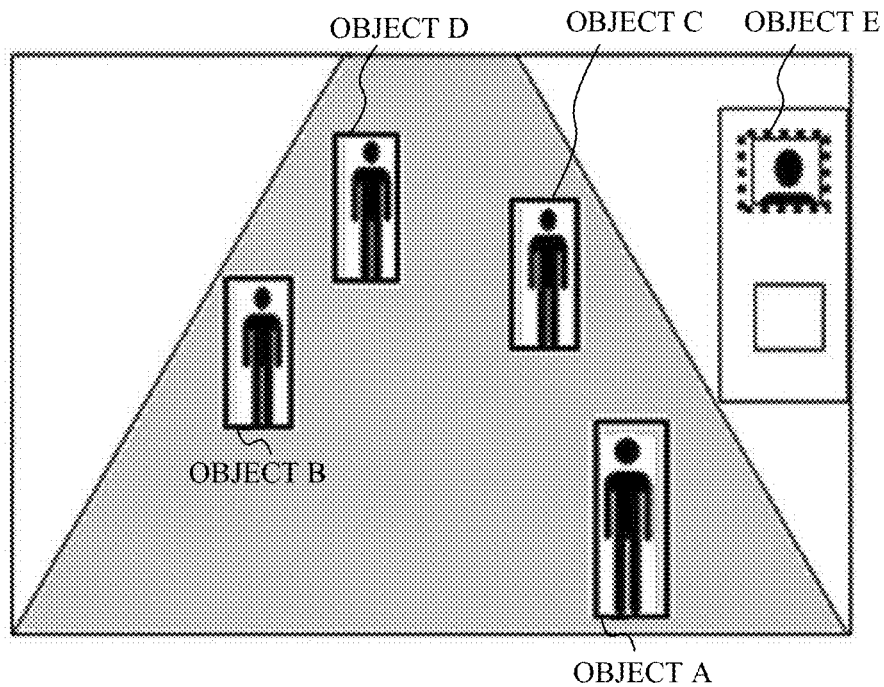
FIG. 12 is a diagram of a situation of a problem according to a third embodiment.
Figure 13:
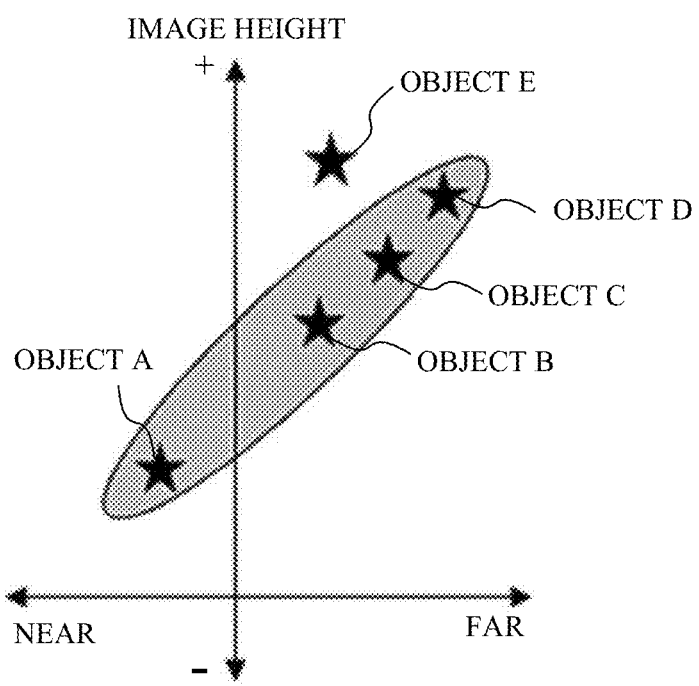
FIG. 13 is a diagram showing a focus position on an imaging plane when the situation in FIG. 12 is measured by the imaging-plane phase-difference detecting method.

However, in an actual environment, not all of the detected objects are located on the tilt/focal plane. For example, FIG. 12 illustrates a situation that includes objects A to D walking on the road and object E, which is a person on a poster such as a signboard of a building. FIG. 13 illustrates focus positions on the imaging plane when the situation of FIG. 12 is detected by the imaging-plane phase-difference detecting method. Thus, it is impossible to arrange the object E and the other objects A to D on the same focal plane. In that case, the tilt/focus position control must be performed using the objects A to D excluding the object E.

Figure 14:
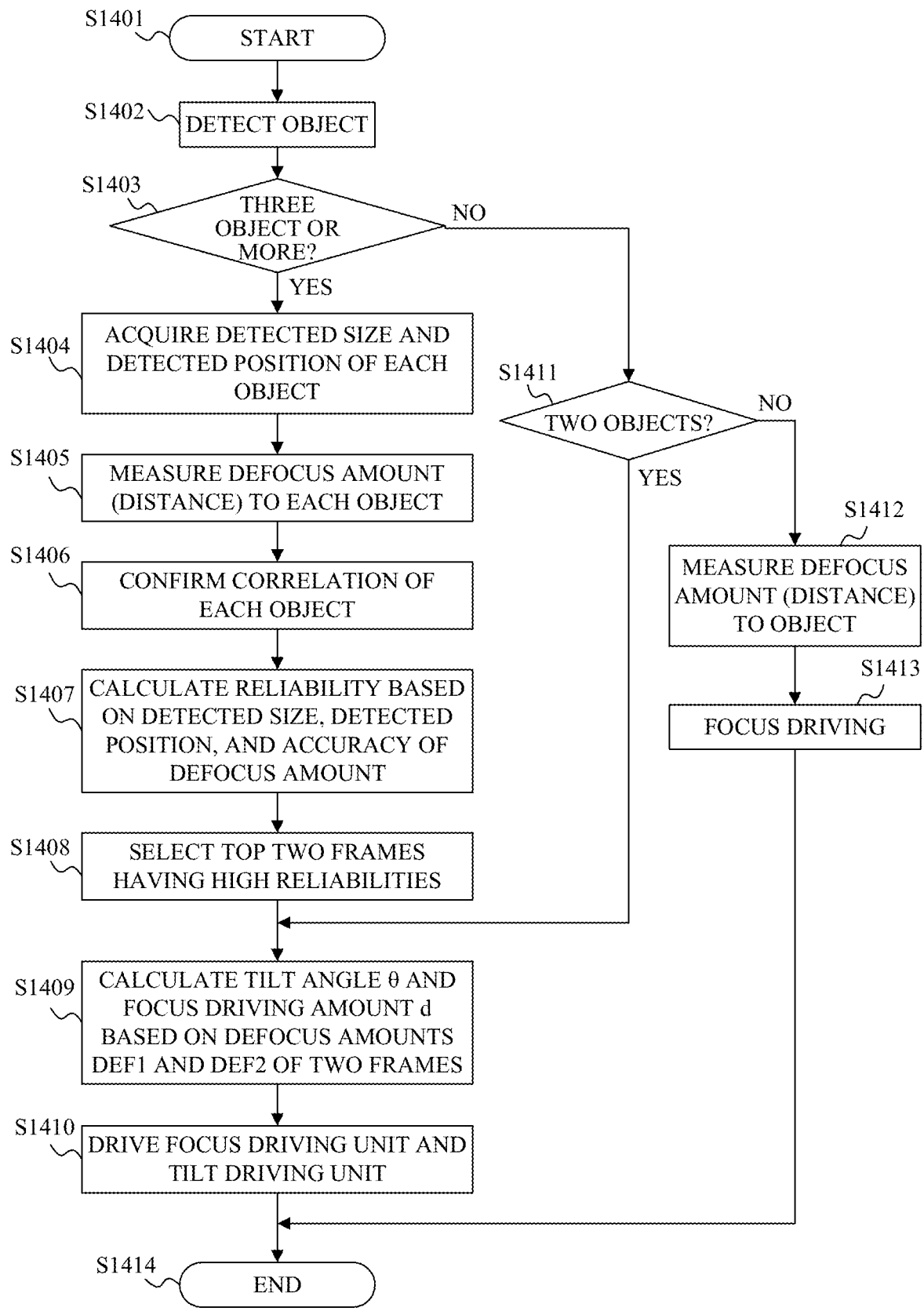
FIG. 14 is a flowchart illustrating a tilt/focus control according to a third embodiment.

Referring now to a flowchart illustrated in FIG. 14, a description will be given of tilt/focus position control processing according to a third embodiment of the present invention. This embodiment will discuss a tilt/focus position control method when it is clear that a detected object is not suitable for a focal plane (or it is clear that the detected object is not located on the focal plane). A detailed description of the same configuration as that of the first embodiment will be omitted.

This embodiment is different from the first embodiment in processing of the step S1406.

In the step S1406, the control unit 115 determines a correlation of the object based on a detected position of the object detected by the object detecting unit 113 and a focus detecting result of the object by the focus detecting information calculating unit 112. Thereby, an object that is clearly unsuitable for the focal plane (or that is not located on the focal plane) is detected by the object detection. This object detection uses a common method, such as the Smirnov-Grubbs test. An object corresponding to an outlier is excluded in the Smirnov-Grubbs test.

The outlier may be detected so that the correlation coefficient is equal to or larger than the threshold.

The control unit 115 excludes the object E corresponding to the outlier and then calculates the reliability in the step 1407.

If detected objects include an object that is not located on the same focal plane even if the tilt/focus position is controlled, this embodiment excludes that object using the correlation. By excluding the object that is not located on the same focal plane, the tilt/focus position control can become highly accurate.

Fourth Embodiment

The first embodiment has discussed an example of implementing the tilt/focus position control method by selecting an object based on reliability.

However, if there may be only objects having low reliabilities in selecting an object (or object frame), and if the focus detection of the selected object is different from the actual object distance, the tilt angle calculated for that object may significantly defocus from the object.

If there are only objects having low reliabilities as described above, information of multiple objects (or object frames) is averaged and a virtual frame having an average image height and an average object distance is set. Calculating the tilt angle using the virtual frame can prevent a significant defocus from the object.

Figure 15:
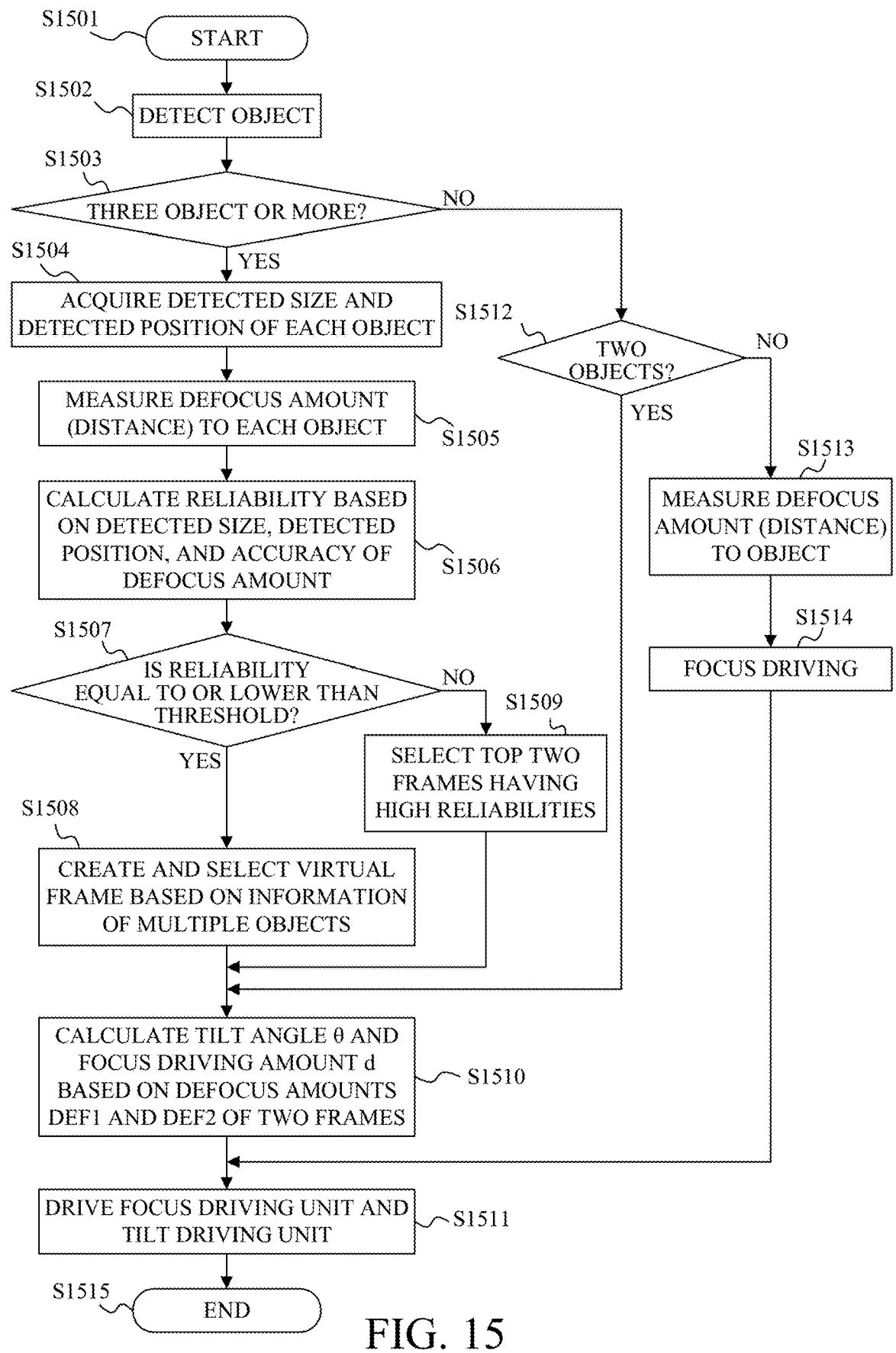
FIG. 15 is a flowchart illustrating a tilt/focus control according to a fourth embodiment.

Referring now to a flowchart illustrated in FIG. 15, a description will be given of tilt/focus position control processing according to a fourth embodiment of the present invention. This embodiment will discuss a tilt/focus position control method when all objects (or object frames) have low reliabilities. A detailed description of the same configuration as that of the first embodiment will be omitted.

This embodiment is different from the first embodiment in processing of the steps S1507 and S1508.

In the step S1507, the control unit 115 determines whether the reliability calculated in the step S1506 is equal to or less than a threshold.

This processing can avoid a significant defocus from the object regardless of whether the reliability is high or low.

If the reliability is lower than the threshold, the flow proceeds to the step S1508, and if the reliability is higher, the flow proceeds to the step S1509.

In the step S1508, the control unit 115 creates and selects a virtual frame based on information of a plurality of objects (or object frames). The virtual frame is calculated by averaging image heights and object distances of the plurality of objects.

Figure 16:
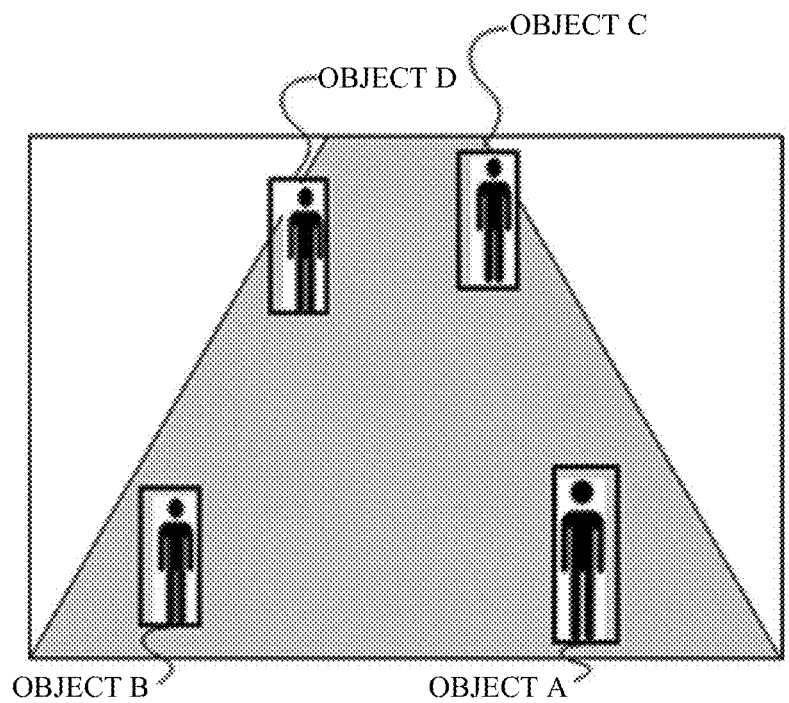
FIG. 16 illustrates a situation of a problem of the fourth embodiment.
Figure 17:
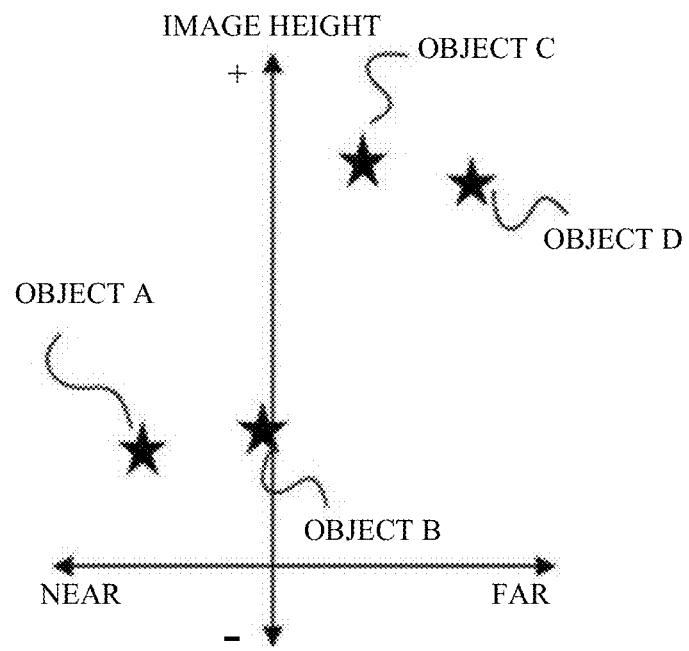
FIG. 17 illustrates a focus position on an imaging plane when the situation in FIG. 16 is measured by the imaging-plane phase-difference detecting method.

For example, FIG. 16 illustrates a situation having four objects. FIG. 17 illustrates focus positions on an imaging plane when the situation of FIG. 16 is detected by the imaging-plane phase-difference detecting method.

FIG. 18 calculates (determine) the reliability in consideration of all of the detected size of the object, the detected position of the object, and the accuracy of the defocus amount.

Since the reliabilities of objects A to D in FIG. 16 are low, a virtual frame X is made by averaging the objects A and B and a virtual frame Y is made by averaging the objects C and D.

Calculating the tilt angle from the image height and the object distance information of the virtual frame X and the image height and the object distance information of the virtual frame Y can avoid a significant defocus from the object.

This embodiment averages information of objects (actual frames) with respect to an image height and an object distance of a virtual frame, but may calculate it by weighting according to the reliability. In selecting an object (actual frame) and creating a virtual frame, the selection may be made separately on the upper and lower sides of the rotation axis of the tilt angle. If objects (object frames) that are separated into the upper part and the lower part of the rotation axis are selected, the image height of the virtual frame may become low, an error may become large, and focal plane calculating accuracy may become low. As described above, by dividing the object into the upper part and the lower part of the rotation axis, the image height of the virtual frame can be maintained, and the accuracy of the tilt angle can be prevented from lowering.

When there are only objects (object frames) having low reliabilities, this embodiment averages the information of multiple objects (object frame), and sets a virtual frame having an average image height and an average object distance. Calculating the tilt angle using the virtual frame can avoid a significant defocus from the object.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each embodiment can provide an image pickup apparatus that can calculate a tilt angle and a focus position with high accuracy by selecting a proper object from among a plurality of objects.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-043123, filed on Mar. 17, 2021, and Japanese Patent Application No. 2021-177170, filed on Oct. 29, 2021, each of which is hereby incorporated by reference herein in its entirety.

What is claimed is:
1. An image pickup apparatus comprising:
a tilt driving unit configured to tilt an image sensor to change a tilt angle that is an angle between an imaging plane of the image sensor and an orthogonal plane orthogonal to an optical axis of an imaging optical system;
a focus driving unit configured to drive a focus lens in the imaging optical system to change a focus position; and
at least one processor or circuit configured to perform a function of at least one of:
an object detecting unit configured to detect a plurality of objects in an image that is captured by the image pickup apparatus;
a defocus amount determining unit configured to determine a defocus amount for each of the plurality of objects detected by the object detecting unit;
a selecting unit configured to select at least two objects from among the plurality of objects detected by the object detecting unit, which are to be used to determine the tilt angle and the focus position, based on at least one of (a) detected sizes of the plurality of objects detected by the object detecting unit, (b) detected positions of the plurality of objects detected by the object detecting unit, and (c) the defocus amounts of the plurality of objects determined by the defocus amount determining unit;

a determination unit configured to determine the tilt angle and the focus position based on the defocus amounts of the at least two objects selected by the selecting unit, and a control unit configured to control the tilt driving unit and the focus driving unit based on the tilt angle and the focus position determined by the determination unit.

2. The image pickup apparatus according to claim 1, wherein the control unit determines reliabilities based on the detected sizes and detected positions of the plurality of objects detected by the object detecting unit, and the defocus amounts of the plurality of objects determined detected by the defocus amount determining unit.

3. The image pickup apparatus according to claim 2, wherein the selecting unit selects top two objects having high reliabilities from among the plurality of objects.

4. The image pickup apparatus according to claim 2, wherein when a new object is detected in an image that is captured by the image pickup apparatus or when it is determined that at least one of the plurality of objects in the image has moved, after the focus position and the tilt angle are calculated, the control unit determines whether or not to redetermine the reliability of the at least one according to a focus detecting method.

5. The image pickup apparatus according to claim 4, wherein the focus detecting method includes a phase difference method and a contrast method.

6. The image pickup apparatus according to claim 5, wherein the control unit redetermines the reliability when the focus detecting method is an imaging-plane phase-difference detecting method.

7. The image pickup apparatus according to claim 2, wherein the control unit determines the reliability for each object in the image that is captured by the image pickup apparatus.

8. The image pickup apparatus according to claim 2, wherein the control unit:

creates a virtual frame when the reliabilities of the plurality of objects are lower than a threshold; and calculates an image height of the virtual frame and object distance information of the virtual frame based on information on the plurality of objects.

9. The image pickup apparatus according to claim 8, wherein the control unit creates the virtual frame by weighting according to the reliabilities of the plurality of objects.

10. The image pickup apparatus according to claim 8, wherein the selecting unit selects the at least two objects from among the plurality of objects which is to be used to create the virtual frame, for each of upper part and lower part of a rotation axis of the tilt angle.

11. The image pickup apparatus according to claim 1, wherein the control unit changes weights of the detected sizes and detected positions of the plurality of objects detected by the object detecting unit, and the defocus amounts of the plurality of objects determined by the defocus amount determining unit, according to a focus detecting method.

12. The image pickup apparatus according to claim 1, wherein the control unit:

determines a correlation of the plurality of objects based on the detected positions of the plurality of objects detected by the object detecting unit and the defocus amounts of the plurality of objects determined by the defocus amount determining unit; and determines, based on the correlation, an object to be excluded from the plurality of objects detected by the object detecting unit.

13. The image pickup apparatus according to claim 12, wherein the control unit determines the object to be excluded based on a Smirnov-Grubbs test.

14. The image pickup apparatus according to claim 1, wherein when the number of objects in the image that is captured by the image pickup apparatus is three or more, the selecting unit selects the at least two objects from among the plurality of objects which are to be used to determine the tilt angle and the focus position, based on at least one of (a) the detected sizes of the plurality of objects detected by the object detecting unit, (b) the detected positions of the plurality of objects detected by the object detecting unit, and (c) the defocus amounts of the plurality of objects determined by the defocus amount determining unit.

15. The image pickup apparatus according to claim 1, wherein the control unit aligns a frame with each of the plurality of objects detected by the object detecting unit, and the selecting unit selects, based on the frame, an object frame to be used to determine the tilt angle and the focus position.

16. A control method of an image pickup apparatus that includes a tilt driving unit configured to tilt an image sensor to change a tilt angle as an angle between an imaging plane of the image sensor and an orthogonal plane orthogonal to an optical axis of an imaging optical system, and a focus driving unit configured to drive a focus lens of the imaging optical system to change a focus position, the control method comprising:

an object detecting step of detecting a plurality of objects in an image that is captured by the image pickup apparatus;

a defocus amount determining step of determining a defocus amount for each of the plurality of objects detected in the object detecting step;

a selecting step of selecting at least two objects from among the plurality of objects detected in the object detecting step, which are to be used to determine the tilt angle and the focus position based on at least one of (a) detected sizes of the plurality of objects detected in the object detecting step, (b) detected positions of the plurality of objects detected in the object detecting step, and (c) the defocus amounts of the plurality of objects determined in the defocus amount determining step;

a determining step of determining the tilt angle and the focus position based on the defocus amounts of the at least two objects detected in the defocus amount determining step, wherein the at least two objects have been selected in the selecting step; and a control step of controlling the tilt driving unit and the focus driving unit based on the tilt angle and the focus position determined in the determining step.

17. A non-transitory computer-readable storage medium storing a computer program that causes a computer of an image pickup apparatus including an image sensor configured to capture an optical image formed by an imaging optical system, to execute processing according to the control method according to claim 16.

* * * * *